United States Patent Office 2,947,716
Patented Aug. 2, 1960

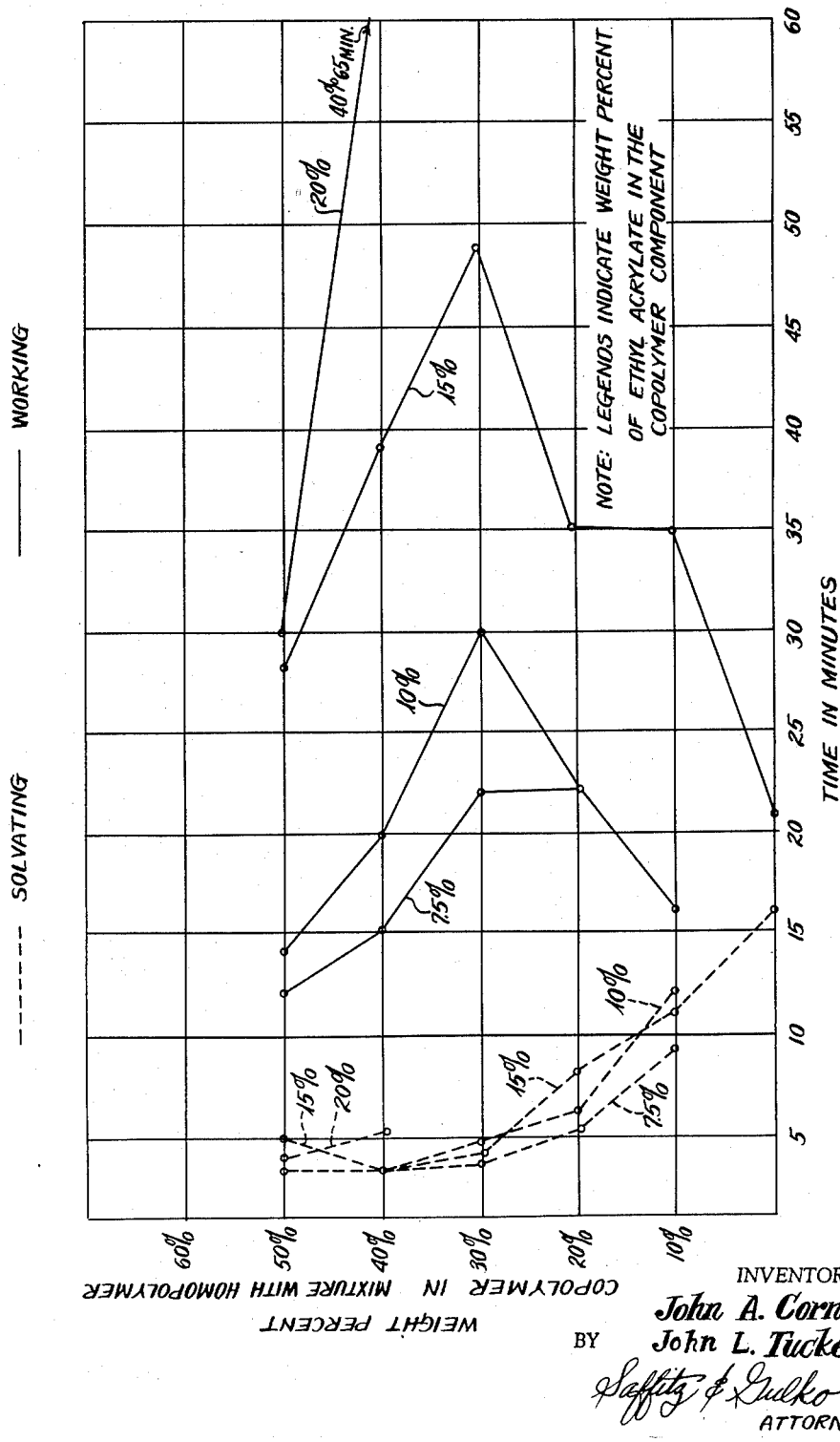

2,947,716
MIXTURES OF LOWER ALKYL ACRYLATE POLYMERS AND METHACRYLATE POLYMERS FOR DOUGH COMPOSITION

John A. Cornell, Conshohocken, and John L. Tucker, Upper Darby, Pa., assignors to H. D. Justi and Son, Inc., a corporation of Pennsylvania Filed July 16, 1957, Ser. No. 672,133

9 Claims. (Cl. 260—41)

The present invention relates to resinous low shrinkage methacrylate resin molding compositions useful in the production of industrial cements, for casting and repairs, and particularly in those situations in which it is desirable to quickly provide a homogeneous dough-like deformable mass which can be worked to shape the same for a prolonged period of time. The invention is especially useful for producing dentures. The invention includes methods for making compositions, materials, and dentures.

The production of a satisfactory dental resin for use as a denture base material is a matter of great difficulty. It is necessary that the denture base material be easy to manipulate, have sufficient strength and resiliency at mouth temperatures to resist normal stresses, be easy to repair, have low shrinkage during fabrication of the denture, and have sufficient impact strength to resist stresses induced in use or by accidental dropping of the denture. Additionally, a desirable denture base material should be quickly and easily mixed together, and should thereafter be workable for a prolonged period of time so that the precise shaping of the base material may be effected before this base material has set up sufficiently to prevent deformation of the same into the precise shape which is desired.

The same factors of ease of manipulation, short mixing time, long working period and sufficient strength and resiliency of final product are also of importance in the production of shaped plastic products irrespective of whether these products are employed for dental or other purposes.

At the present time, methyl methacrylate polymer plasticized with monomeric methyl methacrylate liquid has been quite satisfactory in most of the respects indicated above. The use of methyl methacrylate polymer in finely divided form in a liquid-solid combination controls shrinkage in a desirable direction. Promoted peroxide catalyst systems are used to obtain polymerization at room temperature. The formation of a reasonably accurate non-porous dental conformation, when pressed against the molding form, is achieved by vulcanization at elevated temperatures in a dental flask. The color stability and mechanical properties of methyl methacrylate are also good.

However, the difficulty with methyl methacrylate in the liquid-solid combination is that this combination, which is used in its plastic dough form, e.g., as a denture base material, has a relatively short working time as is explained in detail below. This disadvantage is overcome in accordance with the invention to provide new long-working denture base materials, and new adhesive or casting compositions which also have utility for non-dental commercial use.

The new methyl methacrylate denture base materials of the invention are impermeable to mouth fluids, resist bacterial action and growth, and are capable of being readily colored and pigmented to harmonize with the soft tissues in color, while being translucent or clear in the unpigmented condition. The color properties of the new denture base material of the invention are retained indefinitely. Further, the denture made from the composition is odorless, tasteless, has a low gravity, maintains the absence of odor and taste throughout its use whether in or out of the mouth, and maintains dimensional stability.

The common method of making a denture is to mix in a covered jar the methyl methacrylate polymer in finely divided form, e.g. spherical beads, with a minor proportion of methyl methacrylate monomer, the amount of methyl methacrylate monomer being about one-half the weight of the amount of finely divided solid polymer.

In the case of the conventional methacrylate liquid-solid workable dough-like masses, there are two stages which may be observed:

(1) Finely divided polymer appears to imbibe the liquid monomer and this occurs quite quickly, in the order of one or two minutes or less, (2) The polymer particles containing the imbibed liquid appear to thicken and soften at a relatively slow rate and cause the mobile monomer surrounding the particles to also thicken to produce a workable and deformable dough.

This second phase of solvation in the case of methyl methacrylate takes about thirteen to fifteen minutes. The second phase of thickening of the monomer liquid effectively brings the consistency or viscosity of the composition to a minimum threshold value above which a dough of good working properties is obtained. These two stages of thickening are together termed the solvation time and this period which is necessary for the production of workable dough-like material may vary in duration depending upon the state of subdivision of the finely divided polymer, the surface character of the finely divided polymer (ground material, bead surface, etc.), the ratio of monomer liquid to polymer and the presence or absence of a plasticizer for the methyl methacrylate polymer.

At a stage of solvation, the dough is deformable and can be easily worked to precisely shape the same. As time progresses, the dough becomes thicker and thicker, e.g., the viscosity of the composition increases further above the previously referred to minimum threshold value above which a dough of good working properties is obtained. In this manner, the dough becomes progressively more and more difficult to shape or work until a point is reached where the dough becomes substantially unworkable because of its physical hardness and stiffness or elasticity. This period of time from the attainment of the aforesaid minimum threshold value denoting completion of solvation to the point where further shaping of the dough cannot be effected is termed the working period. Generally, when methyl methacrylate polymer is dispersed in methyl methacrylate monomer, the working period is about 20 minutes. Beyond 20 minutes the dough becomes excessively hard and acts as a stiff rubber.

In other words, although it takes but a few moments to make the necessary intimate admixture between the finely divided solid and liquid components, a very substantial period of time, e.g., about 15 minutes, must be waited before a workable dough is provided. At the same time, and after this extended period of preparation, the dough which is produced is only workable for about 20 minutes so that the precise shaping which is desired and which shaping requires considerable skill, effort and time, must be completed within a relatively short period from the standpoint of the effort which must be completed during this period particularly when more than one denture is made from a mix.

It is not unlikely that liquid methacrylate monomer first penetrates the finely divided resin particles to dissolve therein, and that the thickening of the external liquid phase occurs through fragmentation of solvated particles of resin which go, at least partially into solution in the liquid monomer phase, and that the entire resin particle in some instances solvates without fragmentation to diffuse into the liquid monomer phase to bring about thereby an increase in the consistency of the mixture during solvation to the minimum working consistency.

In an effort to reduce the solvation time, the finely divided polymer particles have been reduced to extremely small size and these polymer particles have been plasticized by the inclusion therein of active plasticizers such as ester plasticizers, dioctylphthalate or dibutylphthalate. In this manner, it has been possible to reduce the time required for solvation to as little as about 3 minutes.

However, the advantage of reduced solvation time is achieved at the expense of reduced hardness in the final product and markedly decreasing the working period of the dough. Similarly, attempts to increase working time, increase solvation time proportionately. Accordingly, reduction in solvation time through the use of smaller particles and plasticized particles is, in reality, disadvantageous because the properties of the final product are deleteriously affected and because the reduced solvation period increases the danger that a portion of the very limited working period will be overlooked so that the dough will set before the necessary mechanical manipulations can be completed.

In accordance with the present invention, it has been discovered that admixtures of liquid polymerizable methyl methacrylate with methyl methacrylate polymer in finely divided solid form in a weight ratio of from 30:70 to 40:60 can be improved by employing as the methacrylate polymer component, a mixture of a homopolymer comprising a methacrylate and a copolymer of a lower alkyl acrylate (methoxyethyl acrylate, butoxyethyl acrylate, or ethyl acrylate, with methyl methacrylate. When the acrylate methyl methacrylate copolymer is employed in admixture with the homopolymer in an amount of from about 8% to about 48% by weight based on the weight of the mixture and when the copolymer contains at least about 7.5% by weight of acrylate component, the solvation time may be reduced (particularly in the case of ethyl acrylate) and the working period is simultaneously lengthened. Moreover, the physical properties and particularly the hardness of the cured resinous composition is maintained.

In a preferred form of the invention, it has been found that incorporation of about 8% to about 48% by weight of a copolymer of ethyl acrylate and methyl methacrylate containing at least about 7.5% by weight of ethyl acrylate based on the weight of the copolymer with from about 92.5% to about 52% of methyl methacrylate homopolymer in the particulate material constituting the solid phase of the solid-liquid mixture permits a surprising increase in the working time and decrease in the solvation time of the mixture without the use of plasticizers. The physical properties of the cured resinous product produced from these solid-liquid mixtures is fully comparable with the physical properties and particularly the hardness of the cured resinous product produced from appropriate admixtures of unplasticized methyl methacrylate homopolymer with methyl methacrylate monomer.

As will be appreciated, for industrial purposes in which an extended working period is not as necessary as it is in the dental field, it is only important in some instances to decrease the solvation time. In such instances, the full range of from about 8% to about 48% by weight of copolymer in the homopolymer-copolymer mixture can be utilized, particularly when the copolymer contains less than 15% by weight of acrylate component. On the other hand and particularly in the dental field, but also generally where it is desired to precisely shape the dough which is produced so that the achievement of a prolonged or extended working period is of importance, it is preferred to employ copolymers containing at least about 12–15% by weight of acrylate component when the full range of from about 8% to about 48% by weight of acrylate copolymer in the copolymer-homopolymer mixture is employed. When less than about 15% by weight of the acrylate in the copolymer is employed, prolonged working periods are achieved substantially only when from 20 to 40% by weight of copolymer in the copolymer-homopolymer mixture is used.

As the proportion of acrylate component in the copolymer increases above about 15% and particularly when the homopolymer-copolymer mixture contains from 20% to 40% by weight of copolymer, the working periods become longer and longer. For practical application there is a limit to the working period which is desired and it is preferred that the acrylate proportion which is in the copolymer not exceed about 40% by weight of acrylate, e.g., ethyl acrylate since the rubberyness of the mix increases with increased percentage of the acrylate.

For example, the addition of 8% by weight of the aforementioned copolymer in the finely divided solid methyl methacrylate polymer, shortens the solvating time from 15 minutes to 3 minutes. By adding a still larger proportion of the aforementioned copolymer, an amount of 10 to 20 percent, the working time is lengthened far beyond that achieved with the methyl methacrylate standard material. In the range of 20 to 40 percent addition of copolymer with an increased content of from about 10 to 20 percent of ethyl acrylate in the copolymer, the working time is quite surprisingly lengthened to from about 45 minutes to about 3 hours or more at room temperature to make the composition particularly useful as a denture base material and for commercial adhesive application.

Thus, it is seen that the addition of at least about 8% and preferably about 20 to 40 percent of the copolymer in the powder mixture containing methyl methacrylate as the remaining component, provides a relatively tremendous lengthening of the working time of the mixture and a greatly shortened time for solvating than is the case with the conventional methyl methacrylate liquid-solid combination.

Not only is there provided improved working time at room temperature (25° C.) but still further improvement is obtained if the liquid-solid dough composition of the invention is stored in a refrigerator maintained at a room temperature of about 0° C. At this temperature, it has been found that the composition of the present invention may be stored for as long as 12 to 15 days without any perceptible hardening of the dough which would affect its workability in the usual manipulation for molding. The advantage for dental purposes and for commercial use is believed to be apparent from the use of refrigerated storage to provide pre-mixed doughs of long working period.

As compared with the conventional methyl methacrylate liquid-solid doughs, the working qualities of the long-working copolymer modified compositions of the present invention are generally superior to the conventional methacrylate dough. An undesirable characteristic of the methyl methacrylate dough is that when it is subjected to localized compression it tends to resist such compression, and acts to recover because of its greater elasticity. This makes accurate conformation molding more difficult and time consuming. In contrast, the dough of the copolymer modified liquid-solid compositions of the present invention has a "deader" feel, tends to be less elastic, does not exhibit recovery under the same conditions of formulation, and is more easily manipulated to form precisely shaped products such as packings and fillings. Thus, it is observed that there is generally better inherent flow with the copolymer modified compositions than in the case of the conventional methyl methacrylate dough material.

The results achieved in accordance with the invention are believed to be unique. Thus, methoxyethyl acrylate and ethyl acrylate may be employed in the copolymer with methyl methacrylate. The ethyl acrylate is superior to the methoxyethyl acrylate and is preferred for this reason particularly with respect to decreased solvation time. However, other acrylates such as, for example, butyl acrylate appears to be inoperative in accordance with the invention, the invention being restricted to methoxyethyl and ethyl acrylate with ethyl acrylate being preferred. It is possible to add other additional components to the copolymer, for example, styrenes in minor proportions. Still further, it is essential that the homopolymer used with the acrylate-methacrylate copolymer be constituted by methyl methacrylate. The methyl methacrylate homopolymer component of the invention cannot be wholly replaced or replaced in major amount with any other methacrylate or acrylate homopolymer. Moreover, the methyl methacrylate homopolymer cannot be modified by the inclusion of ethyl acrylate homopolymer. Thus, in accordance with the invention, when about 30 percent of a copolymer containing about 15% by weight of ethyl acrylate is replaced by a mixture containing 4.5 parts by weight of ethyl acrylate homopolymer and 95.5 parts by weight of methyl methacrylate homopolymer, the extended working periods achieved by the invention do not result (in excess of 45 minutes in this instance).

Referring first to the monomer component of the liquid-solid mixtures of the invention, the preferred monomer liquid is methyl methacrylate monomer on the basis of economy and best all-around properties of the set product. Other methacrylate monomers may be employed to partially or wholly replace the methyl methacrylate monomer. Particularly suitable other methacrylates which may be employed are propyl methacrylate, butyl methacrylate, ethylene dimethacrylate and tetrahydrofurfuryl methacrylate monomers and these can be employed either alone or in combination with each other and with methyl methacrylate monomer but will change working properties. The use of these other monomers adds to the expense of the composition due to the higher cost of these but the advantages of improved flexibilization may be achieved by the incorporation of small amounts of comonomer of propyl methacrylate, for example. Butyl methacrylate provides slightly better adhesion to metal, glass or stone as a comonomer with methyl methacrylate. Tetrahydrofurfuryl appears to provide less shrinkage and improved adhesion.

The liquid polymerizable methacrylate monomer component referred to above is mixed with a finely divided solid component in a weight ratio of from 30:70 to 40:60. The preferred weight ratio is two parts by weight of polymeric solids to one part by weight of liquid monomer.

As indicated previously, the polymeric solids are constituted by a mixture of an acrylate containing copolymer with methyl methacrylate and a homopolymer comprising methyl methacrylate. The copolymer is present in the copolymer-homopolymer mixture in an amount of from about 8% to about 48% by weight based on the weight of the mixture. The remainder of the mixture is constituted by the homopolymer component.

The preferred homopolymer in accordance with the invention is methyl methacrylate. However, a minor proportion, up to about 50% by weight of the methyl methacrylate homopolymer may be replaced by other methacrylate homopolymers to enhance adhesion of the composition to metal or vitreous surfaces. In such instances the modifying homopolymers may be butyl methacrylate, isobutyl methacrylate and ethyl methacrylate homopolymers.

The homopolymer component, whether all methyl methacrylate or a mixture of methacrylate homopolymers, is provided in the form of solid, finely divided particles. These particles may be provided by granulating the homopolymer but it is preferred to employ a spherical pearl polymer produced by emulsion polymerization. The homopolymer particles which are employed in accordance with the invention have an average particle diameter in the range of from 0.07 mm. to 0.59 mm. and preferably have an average particle diameter in the range of from 0.15 mm. to 0.23 mm. The copolymer particles which are employed are similar in size to the homopolymer particles and the above set forth particle diameters are equally applicable to the copolymer particles which are employed in the copolymer-homopolymer mixture.

Referring more particularly to the particle size of the homopolymer and copolymer components, particularly suitable mixtures herein designated as a fine mixture and as a coarse mixture are as follows:

| Percent by weight retained on screens of various mesh | Fine Mixture | Coarse Mixture |
| --- | --- | --- |
| on #30 | 0 | 0 |
| through #30 on #60 | 5 | 40 |
| through #60 on #80 | 20 | 37 |
| through #80 on #100 | 45 | 12 |
| through #100 on #200 | 28.5 | 10 |
| through #200 | 1.5 | 1 |

There may be employed in admixture with the polymeric solids, various fillers and pigments, these being conventional components in the solid-liquid mixtures which are known in the dental field. Among those which may be employed are titanium dioxide, zinc oxide, aluminum oxide, barytes, diatomaceous earth, lead cyanamide, litharge, silica, barium carbonate and magnesium silicate. These fillers and pigments may be used in an amount of from 15% to 30% by weight based on the weight of the solid-liquid mixture.

The polymeric solids may include a liquid plasticizer such as dibutyl phthalate or other ester plasticizer. Plasticizers may be included in the mixtures of the invention and can improve working properties and toughness of the cured product.

The polymer component normally includes, as is known, a small proportion of a suitable catalyst, particularly a vinyl polymerizing catalyst such as benzoyl peroxide. The catalyst may be desirably promoted with an amine as is known.

Table I is a tabular analysis of the experimental data employed to form the basis for the figure of the drawing. Referring more particularly to Table I, there is illustrated for each of various proportions of copolymer in the mixture of copolymer and homopolymer the solvating time and working time for copolymers containing various proportions of ethyl acrylate. In the table, only those copolymers having ethyl acrylate contents of from 7.5 to 20 percent by weight are shown to indicate the significant effect of small additions of ethyl acrylate in the copolymer upon solvating time and working time at the lower part of the range of copolymer additions. The beneficial effect of ethyl acrylate addition on both working time and solvating time is also observed at higher proportions of ethyl acrylate in the solids component of the liquid.

As will be seen from Table I, the solvating time is directly compared with the working time, the preferred composition being those in which a maximum time differential is achieved as between solvating time, on the one hand, and the working period on the other hand. The preferred compositions in Table I are those lying between the dotted lines.

The ethyl acrylate content of the solid component in finely divided form in the liquid-solid methyl methacrylate slurry can also be expressed on the basis of the percent of ethyl acrylate in the total solids consisting of admixed copolymer and homopolymer. On this basis, there may be employed in accordance with the invention, from 0.4% to 24% by weight based on the total weight of copolymer and homopolymer taken together.

Computing from the experimental data reported in Table I and restricting attention to the preferred compositions which are shown as falling between the dotted lines in Table I, a Table II has been prepared.

The preferred proportion of ethyl acrylate in the composition, in order to provide a working time after solvation of at least 40 minutes, is at least about 4.5% by weight of ethyl acrylate based on the total weight of copolymer and homopolymer solids which are employed as the solid component of the solid-liquid composition. The basis for this preferred minimum of 4.5% will be apparent from Table II.

As will be seen from Table II, the working time progressively increases as the proportion of ethyl acrylate in the mixture of copolymer and homopolymer increases. At the same time, the solvation time of preferred mixtures does not vary significantly.

Preferably, the proportion of ethyl acrylate in the mixture of copolymer and homopolymer does not exceed about 10 percent by weight, this preferred maximum proportion of ethyl acrylate being particularly meaningful with the compositions employed for dental purposes, wherein unexpected working advantages are obtained.

It should be appreciated however, that the compositions of the invention are of utility beyond the dental field. When the compositions are employed for these non-dental applications and particularly in the instance of providing long-working cementing compositions and adhesive casting compositions for general utility, working times can be increased to a period of more than 3 hours and up to 7 or 8 hours by adjusting the proportion of ethyl acrylate in the total solids of the slurry to percentages of from about 20 to 24 percent or by increasing the monomer to polymer ratio.

In those cases of commercial application, where more than about 16 percent of ethyl acrylate is employed in the total solids of the slurry, it is found that the addition of further amounts of ethyl acrylate does appreciably lengthen the working time to a degree but the rubbery consistency which develops is useless for forming highly accurately molded dental products particularly at levels of ethyl acrylate beyond 18–22%.

The utilization of a major proportion of methyl methacrylate homopolymer in the solids contributes desirable toughness to the final product. The utilization of amounts of ethyl acrylate substantially in excess of 18 percent, i.e., about 20–24%, also appears to make the final product less tough and somewhat more sticky than with a content of 10–18 percent of ethyl acrylate. Accordingly, for commercial purposes where working times in excess of 4 hours are desired, suitable cementing and casting compositions can be produced at lesser expense with an ethyl acrylate content of about 10 percent to about 18 percent.

Referring again to the figure of the drawing it is to be particularly observed that a greater disparity between solvating time and working time occurs when the weight percent of copolymer in the mixture of copolymer and homopolymer is within the range of from 20 to 40 percent by weight in total solids.

Thus, as summarized in Table II, the preferred composition for dental purposes contains between 20 to 40 percent of a copolymer of ethyl acrylate and methyl methacrylate, said composition containing from about 6.5 to about 4.5 percent of ethyl acrylate and the remainder being methyl methacrylate. Stated in terms of the ethyl acrylate content of the copolymer-homopolymer mixture forming solids in the solid-liquid slurry, the preferred ethyl acrylate content of said solids mixture lies between about 4.5 and 18 percent and the solid mixtures containing said proportion of ethyl acrylate contain 20 to 40 percent by weight of the copolymer constituent.

The addition of a third monomer to the composition of the copolymer such as styrene changes the setting time markedly and also changes the "feel" properties. Examples of these terpolymers are given in Table III. Similarly, methoxyethyl acrylate can be substituted for ethyl acrylate to give slightly improved working time and also slightly improved solvation time. Normal butyl acrylate, methyl acrylate or ethylhexyl acrylate show no advantage in working time. Some of these results are shown in Table III.

The about referred to Table I, Table II, and Table III are indicated as follows:

TABLE I

| Percent Copolymer in Mixture of Copolymer and Homopolymer | Solvating Time and Working Time for Copolymer of Various Ethyl Acrylate Content | | | | | | | |
|---|---|---|---|---|---|---|---|---|
| | 7.5% | | 10% | | 15% | | 20% | |
| | ST | WT | ST | WT | ST | WT | ST | WT |
| 50% | 3 | 12 | 3 | 14 | 4 | 38 | 3 | 30 |
| 40% | 3 | 15 | 3 | 20 | 4 | 60 | 3 | 65 |
| 30% | 3.5 | 22 | 4.5 | 30 | 6 | 65 | 4 | 65 |
| 20% | 5 | 22 | 6 | 22 | 8 | 35 | 6 | 70 |
| 10% | 9 | 15 | 12 | 16 | 11 | 35 | | |

NOTE 1.—All percentages are by weight.
NOTE 2.—The dotted lines designate preferred compositions possessing short solvating time coupled with long working time.

TABLE II

| Percent Ethyl Acrylate in Copolymer | Solvation Time (Average) | Working Time (Average) | Percent Ethyl Acrylate in Mixture |
|---|---|---|---|
| 7.5% | 4 | 22 | 1.5–2.25 |
| 10% | 4 | 25 | 2–4 |
| 15% | 4 | 47 | 4.5–7.5 |
| 20% | 4 | 75 | 8–10 |

TABLE III

| | 75% 15% 5 5 | 70% 20% 5 5 | 80% 2.5 7.5 10 | 90% MMM 10% MEA[4] | | 90% MMM 10% BEA[5] | |
|---|---|---|---|---|---|---|---|
| MMM[1] | | | | | | | |
| Eth. Acr.[2] | | | | | | | |
| DBP[3] | | | | | | | |
| Styrene | | | | | | | |

| | ST | WT | ST | WT | ST | WT | ST | WT | ST | WT |
|---|---|---|---|---|---|---|---|---|---|---|
| Composition: | | | | | | | | | | |
| 50% | 3 | 180 | | | 3 | 60 | 20 | 60 | 3 | 12 |
| 40% | 4 | 165 | 10 | 360 | 3 | 80 | 20 | 60 | 3.5 | 30 |
| 30% | 6 | 120 | 17 | 420 | 5 | 90 | 20 | 45 | 4.5 | 50 |
| 20% | 12 | 80 | 18 | 240 | 5 | 80 | 20 | 40 | 5.5 | 50 |

[1] Methyl methacrylate monomer.
[2] Ethyl acrylate.
[3] Dibutyl phthalate.
[4] Methoxy ethyl acrylate.
[5] Butoxy ethyl acrylate.

*Example I*

The solid component was prepared by admixing 30 parts by weight of a copolymer of ethyl acrylate and methyl methacrylate with 70 parts by weight of methyl methacrylate homopolymer. Both the copolymer component and the homopolymer component were constituted by finely divided particles of various sizes as specifically identified hereinbefore as a "fine mixture." The homopolymer was prepared by bead polymerization in the manner specifically set forth on page 55 of "Monomeric Acrylic Esters," by Riddle (Reinhold Publishing Corp., 1954), and the polymer particles were produced in the same manner employing in place of 15% by weight of the methyl methacrylate monomer, 15% by weight of ethyl acrylate monomer. The copolymer particles so produced had an average molecular weight of about 600,000.

The solid particulate mixture specified above was mixed with methyl methacrylate monomer in a weight ratio of 2:1. The suspension so produced was a paste which slowly thickened and at the end of 4.0 minutes a thick deformable dough was produced which could be easily worked to shape the same. This dough hardened progressively, but it was still possible to deform this dough 65 minutes after the dough in workable condition had been formed. The shaped dough was then vulcanized in a dental flask and the product cured. The hardness and toughness of the cured product so prepared was fully comparable to the hardness and toughness of a similar composition treated in the same way but employing as the polymeric solid component only methyl methacrylate homopolymer. This latter mixture containing only methyl methacrylate homopolymer required 20 minutes of solvating time in order to produce a workable dough and this dough could only be worked for 30 minutes before it became so hard and stiff that it could not be deformed by hand manipulation.

The homopolymer and copolymer particles referred to above can be produced in various ways to produce comparable results. For example, the copolymer particles can be produced by granulating a copolymer prepared in the manner indicated in the patent to Mast, No. 2,588,398. Equally good results were obtained by employing instead of a mixture of di- and mono-sodium phosphates as in the Riddle publication, calcium phosphate as the suspending agent as indicated in the patent to Hohenstein, No. 2,652,392. Another method of producing the homopolymer which may be used is described in the patent to Marks, No. 2,383,069, and this method is of advantage in the production of well-formed spherical beads.

Various amine promoters may be employed. Certain aryl alkyl tertiary amines are preferred as activators because they can initiate polymerization of doughs even at room or body temperature. Among the activators which may be used are N,N-dimethyl-p-toluidine, N,N-diethylaniline, m-tolyl diethanolamine and phenyl diethanolamine.

Sulfinic acids are non-discoloring powerful activators, which may also be used, but are not very stable at room temperatures in contact with moist air. For this reason the sulfinic acid derivatives may be refrigerated dry and added to the polymer or to the liquid monomer just prior to use.

*Example II*

Example I was repeated employing the coarse particulate mixture in place of the fine particulate mixture which was used in Example I. The results obtained were substantially identical with the exception that solvation required about one minute longer before a workable dough was produced.

*Example III*

Example I was repeated using various proportions of copolymer in the copolymer-homopolymer mixture and also with various proportions of ethyl acrylate in the acrylate-ethyl methacrylate copolymer. The results produced are shown in the graph presented in the drawing. In each instance designated by the graphed lines, the product cured to a hard and tough condition and was fully comparable in physical character with the cured product obtained by entirely omitting the copolymer component of this invention, in which case, the advantages of reduced solvation time and extended working time were not obtained.

*Example IV*

Example I was repeated employing 70 parts by weight of the solid particulate mixture and 30 parts by weight of the methyl methacrylate monomer. The results achieved were fully comparable to the results set forth in Example I except that vigorous mixing is necessary. In contrast to the lengthened solvation time observed using conventional all methyl methacrylate liquid-solid mixtures, at low monomer content (30:70), the incorporation of ethyl acrylate copolymer in the solid component of the liquid-solid mixtures of the invention produces a solvation time which is substantially the same despite the small proportion of monomer. In conventional mixtures the small proportion of monomer decreases the solvation time by a few minutes. In other words, the achievement of low solvation time at high solids content is uniquely an achievement of the invention.

*Example V*

Example I was repeated employing 1.5 to 1 part by weight of the solid particulate mixture to methyl methacrylate monomer. The results achieved were comparable to the results set forth in Example I with the exception that the high proportion of liquid component lead to some shrinkage in the resinous product, this shrinkage taking place during the curing. The setting and working times were similar to those indicated in Example I.

Example VI

Example I was repeated employing in the solid-liquid mixture 15% by weight based on the weight of the solid-liquid mixture of a filler constituted by equal parts by weight of a mixture of titanium dioxide and barytes having an average particle diameter of 0.2 mm. The cured resinous product which was produced had increased hardness.

Example VII

Example I was repeated using a mixture of 40% by weight of butyl methacrylate and 60% by weight of methyl methacrylate as the homopolymer. The solvation and working time were substantially the same as indicated in Example I.

Example VIII

Example I was repeated using as the monomer equal weight of tetrahydrofurfuryl methacrylate. The results were substantially the same as reported in Example I.

Example IX

Example I was repeated using as the monomer 10% by weight of ethylene dimethacrylate monomer and 90% bye weight of methyl methacrylate monomer. The results were substantially the same as reported in Example I.

Example X

Example I was repeated using a copolymer composed of 10% by weight of methoxyethyl acrylate and using various proportions of copolymer in the copolymer mixture. The results are shown in Table III.

Example XI

Example I was repeated using a copolymer composed of 10% by weight of butoxyethyl acrylate and using various proportions of copolymer in the copolymer mixture. The results are shown in Table III.

Dry pigments may be mechanically or surface blended with the spherical polymer granules to develop the desired color in the finished mass. Dyes may be incorporated in the monomer before mixing to produce the attractive clear, variously colored arcylic articles in industry.

In dental compositions, use may be made of vermillion, sulfides of mercury, and cadmium red with zinc or titanium oxide to produce the desired pink shade in denture-base resin. Cadmium yellow can be used for deep yellow to orange color. Such pigments as carbon black and the oxides of iron, zinc or titanium are harmless and may be employed with success to produce various shades of gray and brown. The burnt and raw umbers and siennas, and the ochres are useful for producing variations in brown shades. Other useful pigments for specific shadings include ultramarine blue and chrome green and yellow. The pigments employed in dental porcelain can be utilized also for methacrylate crowns and inlays, while any pigment employed in dental rubber can be used in the mixture of the invention. Soluble dyes often tend to bleach to a lighter shade in the mouth, for which reason they are generally undesirable. In the commercial dental products now available, the pigments are usually all fairly stable. Except for the clear transparent shades, most resins have varying degrees of opacity. The oxides of zinc or titanium serve as opacifying agents. Titanium dioxide is the more effective of the two, so that only minute quantities are required.

As has been previously indicated, the compositions of the invention may be cured by polymerization in the presence of suitable catalysts at room temperature or they may be heated to effect a cure to a hard resinous condition by the use of elevated temperatures. The compositions may be cured in situ employing, for example, radiant heat and/or ultra-violet light but in situ curing is preferably carried out under conditions where equipment is not available by using an amine-promoted catalyst such as those previously indicated. Also sulfinic acid promoted catalysts may be used.

The invention is defined in the claims which follow:

We claim:

1. A resinous molding composition which is prepared by mixing (1) a methacrylate monomer selected from the group consisting of methyl methacrylate, propyl methacrylate, butyl methacrylate, tetrahydrofurfuryl methacrylate, ethylene dimethacrylate and mixtures thereof, and (2) metacrylate polymer composition in a weight raiton of from 30:70 to 40:60, said polymer composition (2) being in finely divided solid form of spheres having an average diameter in the range of from about 0.07 millimeter to about 0.59 millimeter and being solvatable by said methyl methacrylate when admixed therewith to form a soft spreadable thickened dough, said polymer composition (2) consisting of a mixture of from about 8% to about 48% (a) an all methacrylate polymer selected from the group consisting of polymethyl methacrylate, methyl methacrylate-butyl methacrylate copolymer, methyl methacrylate-isobutyl methacrylate copolymer and methyl methacrylate-ethyl methacrylate copolymer and the remainder being (b) a copolymer of an acrylate selected from the group consisting of methoxyethyl acrylate, butoxyethyl acrylate and ethyl acrylate with methyl methacrylate, said acrylate component of the acrylate copolymer being present in an amount of from at least about 7.5% and up to 20% by weight of said acrylate copolymer, said copolymer being present in said mixture of finely divided resin solids, whereby said composition has a reduced solvation time.

2. A resinous molding composition as recited in claim 1, wherein said all methacrylate polymer (a) is polymethyl methacrylate and in which said spheres have an average diameter in the range of from 0.15 millimeter to 0.23 millimeter.

3. A resinous molding composition as recited in claim 1 in which said all methacrylate polymer (3) is polymethyl methacrylate and in which the weight ratio of methyl methacrylate to finely divided solid spheres is about 1:2.

4. A resinous molding composition as recited in claim 1 in which said all methacrylate polymer (3) is polymethyl methacrylate and in which said acrylate copolymer is a copolymer of methyl methacrylate and methoxyethyl acrylate, the acrylate components being present in an amount of about 7.5% up to 20% by weight of copolymer.

5. A resinous, molding composition as recited in claim 1 in which said all methacrylate polymer (3) is polymethyl methacrylate and in which said acrylate copolymer is a copolymer of methyl methacrylate and ethyl acrylate, the amount of ethyl acrylate being from about 5% to about 20% by weight of said copolymer and the remainder being methyl methacrylate.

6. A resinous molding composition as recited in claim 1 in which said all methacrylate polymer (3) is polymethyl methacrylate and in which said acrylate copolymer is a copolymer of methyl methacrylate and butoxyethyl acrylate, the acrylate components being present in an amount of about 7.5% to 20% by weight of copolymer.

7. A resinous molding composition as recited in claim 1 in which said all methacrylate polymer (3) is polymethyl methacrylate and in which there is included in said molding composition up to about 30% by weight of a particulate filler.

8. A resinous molding composition which is prepared by mixing (1) methyl methacrylate and (2) a methacrylate polymer composition in weight ratio of from 30:70 to 40:60, said composition being in finely divided solid spherical pearls produced by suspension polymerization, having an average particle diameter of about 0.07 millimeter to about 0.59 millimeter and being solvatable by said methyl methacrylate when admixed therewith to form a soft spreadable thickened dough, said methacrylate polymer composition (2) consisting of a mixture of (a) polymethyl methacrylate and (b) a copolymer of an arcylate selected from the group consisting of methoxyethyl acrylate, butoxyethyl acrylate and ethyl acrylate with methyl methacrylate, said copolymer (b) being present in said methacrylate polymer composition (2) in an amount of from about 8% to 48% by weight and the remainder of composiition (2) being polymethyl methacrylate, and said copolymer (b) containing from about 1% up to about 20% by weight of said acrylate, the remainder being methyl methacrylate, whereby said composition has reduced solvation time and a lengthened working period.

9. A resinous molding composition comprising (1) methyl methacrylate and (2) a methacrylate polymer composition in a weight ratio of from 30:70 to 40:60, said polymer composition (2) being in finely divided solid spheres having an average diameter in the range of from 0.07 millimeter to about 0.59 millimeter and be solvatable by said methyl methacrylate when admixed with the same to form a soft non-rigid spreadable thickened dough, said methacrylate polymer composition (2) consisting of a mixture of (a) polymethyl methacrylate and (b) a copolymer of an acrylate selected from the group consisting of methoxyethyl acrylate, butoxyethyl acrylate and ethyl acrylate with methyl methacrylate, said copolymer (b) being present in said polymer composition (2) in an amount of from about 20% to about 40% by weight of said composition, and said copolymer (b) containing at least about 10% and up to about 20% by weight of said acrylate, the remainder being methyl methacrylate, whereby said composition has a reduced solvation time and a lengthened working period.

References Cited in the file of this patent

UNITED STATES PATENTS 2,848,750　　Sannecke et al. _____ Aug. 26, 1958

FOREIGN PATENTS 760,344　　Great Britain _____ Oct. 31, 1956
F10,545　　Germany _____ Sept. 29, 1955